Figure 1:
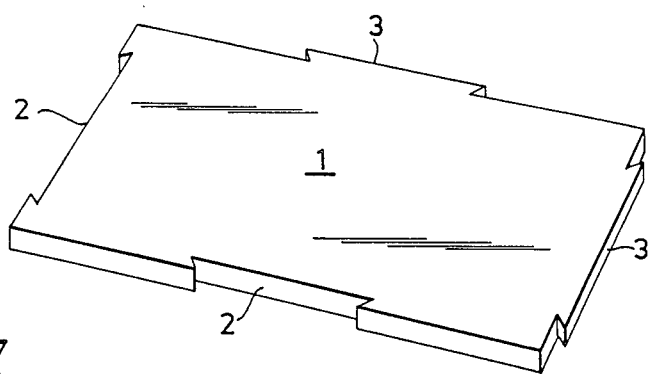

United States Patent [19]

Lilja

[11] Patent Number: 4,756,519
[45] Date of Patent: Jul. 12, 1988

[54] ARRANGEMENT IN CUTTING BOARDS

[76] Inventor: Curt L. Lilja, Barrgatan 19, S-335 00 Gnosjo, Sweden

[21] Appl. No.: 924,338

[22] Filed: Oct. 29, 1986

[30] Foreign Application Priority Data

Nov. 4, 1985 [SE] Sweden ............................. 8505183

[51] Int. Cl.⁴ ............................................. B23Q 3/00
[52] U.S. Cl. ................................................... 269/302.1
[58] Field of Search ................ 269/289 R, 302.1, 303; 403/381; 52/591, 594; 404/41

[56] References Cited

U.S. PATENT DOCUMENTS

| | | | |
|---|---|---|---|
| 863,307 | 8/1907 | McKenzie | 269/289 R |
| 2,609,024 | 9/1952 | Russ | 269/289 R |
| 4,173,287 | 11/1979 | Kumakawa | 403/381 |
| 4,550,543 | 11/1985 | Valenzano | 52/591 |

FOREIGN PATENT DOCUMENTS 535327 10/1931 Fed. Rep. of Germany ...... 269/289

*Primary Examiner*—Frederick R. Schmidt
*Assistant Examiner*—Judy J. Hartman
*Attorney, Agent, or Firm*—Kinzer, Plyer, Dorn, McEachran & Jambor

[57] ABSTRACT

This invention is concerned with a cutting surface formed of at least two boards. Each board is rectangular in shape and has opposing, substantially straight edges. There is a notch in one side edge and a projection in the other side edge to permit frictional interlocking and removal of the boards from engagement with one another. A support for guiding the slicing of bread has a base corresponding in shape and size to a projection so that the support can be inserted in an unused recess of one of the boards forming the cutting surface.

1 Claim, 1 Drawing Sheet

U.S. Patent    Jul. 12, 1988    4,756,519

ARRANGEMENT IN CUTTING BOARDS

The present invention relates to an arrangement in cutting boards, support surfaces and the like, of the kind which have two mutually opposing, substantially straight side edges.

In order to fulfil all normal purposes for which such boards are intended, it is necessary to have in possession cutting boards and like supports of varying sizes and proportions, which may be difficult to achieve.

The object of the present invention is to provide a cutting board arrangement in which this problem is solved in a simple and practical fashion.

This object is realized in accordance with the invention by providing one side of such a cutting board with at least one recess, slot or groove, and the other side with at least one corresponding projection, said at least one recess, slot or groove and the corresponding at least one projection being such as to enable two or more similarly constructed cutting boards to be joined firmly, edge to edge, with the aid of respective recesses and projections.

This enables cutting boards to be assembled to form a cutting surface of any desired size when so required, or the boards to be used separately on other occasions. The aforesaid recesses and projections can be formed on both the long sides and the short sides of an oblong rectangular board, thereby providing many combination possibilities.

In addition, the advantage is afforded whereby certain ancillary devices capable of facilitating the cutting of, for example, bread, particularly by children and handicapped people, can be readily fitted firmly to the board by providing the base part of the ancillary device with means for connecting the device to a recess or projection on the board.

Figure 2:
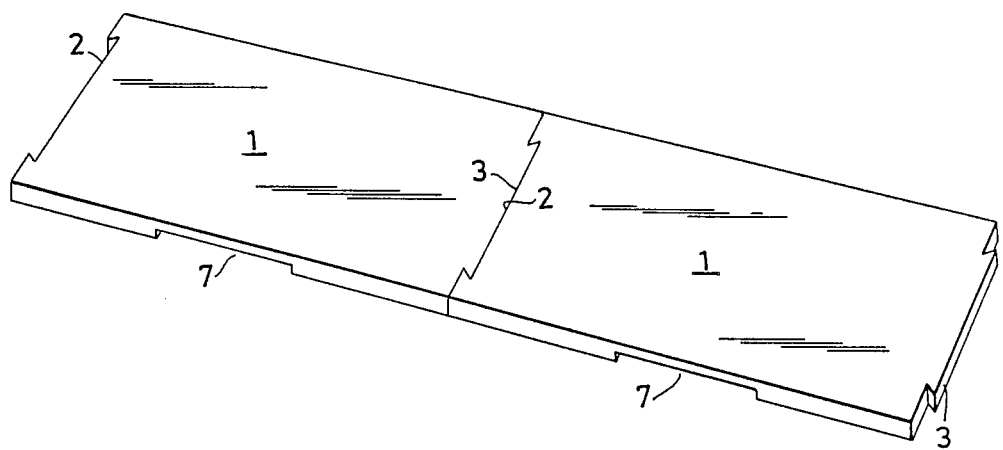
Figure 3:
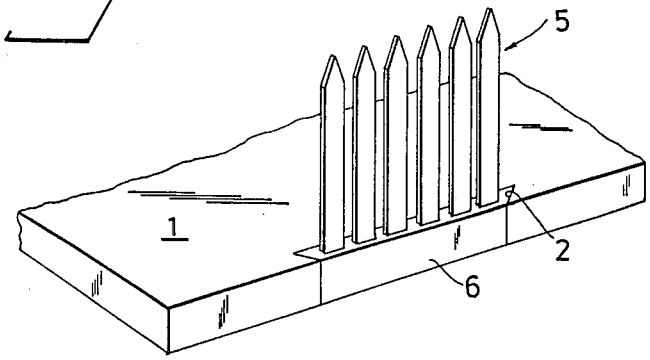

The invention will now be described in more detail with reference to the accompanying drawing, in which FIG. 1 is a perspective view of one exemplifying embodiment of a cutting board arrangement according to the invention;

FIG. 2 illustrates two cutting board arrangements according to FIG. 1 connected together; and FIG. 3 illustrates an ancillary device for facilitating the cutting of bread, this ancillary device having a base part intended for co-action with a recess provided in the arrangement according to FIGS. 1 or 2.

FIG. 1 illustrates an oblong rectangular cutting board 1 having two pairs of mutually opposing, substantially straight side edges in which uniform recesses 2 and projections 3 are provided. This enables two or more such cutting boards to be connected together, edge to edge, in the manner illustrated in FIG. 2, wherewith either two short sides or two long sides of the board can be connected together, as required.

A further advantage afforded by the recesses 2 and the projections 3 is that ancillary devices 5 intended for different purposes, such as the cutting of broad, can be provided with a base part 6 so constructed as to enable the base part to be connected to a projection 3 or, as is preferred, to a recess 2, in the manner illustrated in FIG. 3.

It will be understood that the invention is not restricted to the illustrated embodiments, but that modifications can be made within the scope of the invention defined in the following claims. Thus, the recesses and projections may have a form different to that illustrated and may optionally be divided into two sections. In addition, a handle 7 may be provided at the centre portions of two mutually opposing side edges, the recesses and projections suitably being distributed and located on both sides of the handle and similarly on the remaining two side edges.

I claim:

1. A cutting surface formed of at least two rectangular boards, each board having two mutually opposing, substantially straight side edges, one of the side edges of a board having a vertically-extending recess and the other side edge of the board having a corresponding projection so that one rectangular board can be interlocked with the other rectangular board to form the cutting surface by frictionally interlocking a projection on one board with a recess on the other board, and further including a guide for the slicing of bread, which guide has a base corresponding in size and shape to a projection of a board so that the base can be inserted in an unused recess of a board forming the cutting surface and a plurality of upstanding guide members mounted on the base and aligned in a row, with the guide members spaced apart a sufficient distance from each other to receive a knife blade between adjacent guide members.

* * * * *